United States Patent [19]

Suzuki

[11] 4,367,707
[45] Jan. 11, 1983

[54] COMBUSTION CHAMBER OF AN INTERNAL COMBUSTION ENGINE

[75] Inventor: Makoto Suzuki, Susono, Japan

[73] Assignee: Toyota Jidosha Kogyo Kabushiki Kaisha, Toyota, Japan

[21] Appl. No.: 342,319

[22] Filed: Jan. 25, 1982

Related U.S. Application Data

[63] Continuation of Ser. No. 184,488, Sep. 5, 1980, abandoned, which is a continuation of Ser. No. 972,290, Dec. 22, 1978, abandoned.

[30] Foreign Application Priority Data

Oct. 31, 1978 [JP] Japan .................................. 53-133142

[51] Int. Cl.³ .................................................. F02B 23/00
[52] U.S. Cl. ................................. 123/306; 123/193 H; 123/661
[58] Field of Search ............... 123/661, 664, 666, 657, 123/667, 260, 306, 309, 193 R, 193 P, 193 H, 193 CH

[56] References Cited

U.S. PATENT DOCUMENTS

| 2,514,730 | 7/1950 | Sonderegger | 123/279 |
| 2,800,123 | 7/1957 | Fisher | 123/657 |
| 2,991,780 | 7/1961 | Brien | 123/661 |
| 3,034,491 | 5/1962 | Balmer | 123/657 |
| 4,133,331 | 1/1979 | Otsubo et al. | 123/638 |
| 4,146,004 | 3/1979 | Dubois | 123/193 CH |
| 4,162,661 | 7/1979 | Nakanishi et al. | 123/193 P |
| 4,218,880 | 8/1980 | Kuroda et al. | 123/657 |

OTHER PUBLICATIONS

Technische Rundschau, Mar. 14, 1958.

Primary Examiner—Craig R. Feinberg
Attorney, Agent, or Firm—Kenyon & Kenyon

[57] ABSTRACT

An internal combustion engine comprising a piston having a flat top face. A single squish area is formed on one side of the peripheral inner wall of the cylinder head. The combustion chamber has an approximately semi-spherical shape. The spark plug is arranged at the center of the combustion chamber.

4 Claims, 7 Drawing Figures

COMBUSTION CHAMBER OF AN INTERNAL COMBUSTION ENGINE

This is a continuation of application Ser. No. 184,488 filed Sept. 5, 1980, which was a continuation of application Ser. No. 972,290 filed Dec. 22, 1978, both prior applications having been abandoned.

DESCRIPTION OF THE INVENTION

The present invention relates to a combustion chamber of an internal combustion engine.

In order to increase the burning velocity in the combustion chamber of an engine, there has been known a method of creating a strong turbulence in the combustion chamber by the squish flow which is spouted out from the squish area formed between the inner wall of the cylinder head and the top face of the piston. However, as a result of many experiments conducted by the inventor, it has been proven that the arrangements of the squish area and the spark plug have a great influence on the burning velocity in the combustion chamber.

For example, an internal combustion engine has been proposed in which a pair of squish areas is formed at the opposing peripheral portions of the inner wall of the cylinder head, and in addition, the spark plug is located at the apex of a semispherical combustion chamber. In an engine of this type, since a pair of squish flows is spouted out towards the center of the combustion chamber from the opposing peripheral portions of the combustion chamber after ignition, the flame cannot easily spread towards the periphery of the combustion chamber. As a result of this, the flame cannot grow sufficiently before the downward movement of the piston is started, and, besides, the flame is weak. In addition, when the piston moves downwards after ignition, a large part of the unburned mixture spouted from the squish areas is again sucked into the squish areas due to the temporary pressure drop in the squish areas. However, at this time, since the weak flame cannot ignite the unburned mixture within the squish areas, a problem occurs in that it is impossible to sufficiently increase the burning velocity. On the other hands, an internal combustion engine of another type has been proposed, in which a single squish area is formed on one side of the peripheral inner wall of the cylinder head and, in addition, the spark plug is arranged on the other side of the peripheral inner wall of the cylinder head at a position opposite to the squish aresa. In an engine of this type, since the spark plug is arranged on the peripheral inner wall of the cylinder head, a long time is necessary for the flame to propagate over the entire space of the combustion chamber after ignition. In addition, since the flame is plushed towards a region in the combustion chamber, which region has a relatively small volume and is located at a position opposite to the squish area, by the squish flow spouted from the squish area after ignition, the speed of the flame propagation towards the squish area becomes low. This results in a problem in that it is impossible to sufficiently increase the burning velocity.

An object of the present invention is to provide an internal combustion engine capable of considerably increasing the burning velocity by arranging the squish area and the spark plug of the engine at optimum positions.

According to the present invention, there is provided an internal combustion engine comprising: a cylinder block having a cylinder bore therein; a piston having a flat top face and being reciprocally movable in the cylinder bore; a cylinder head fixed into the cylinder block and having an inner wall comprising a flat wall portion and a concave wall portion, said flat wall portion circumferentially extending along a part of the periphery of the inner wall and defining a flat squish area between the flat wall portion and the flat top face of the piston, which concave wall portion defining a combustion chamber which has a central axis; an intake valve arranged on the concave wall portion; an exhaust valve arranged on the concave wall portion; and, a spark plug arranged in the combustion chamber on an approximately central axis of the combustion chamber.

The present invention may be more fully understood from the description of the preferred embodiments of the invention set forth below and from the accompanying drawings.

DESCRIPTION OF PREFERRED EMBODIMENTS

Figure 1:
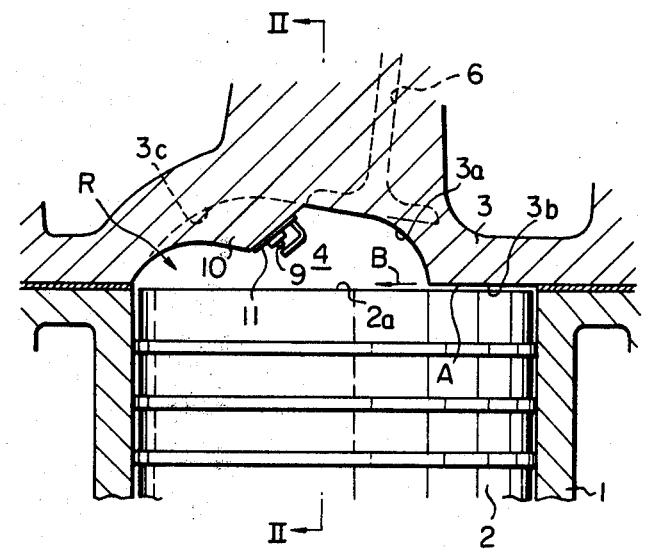
FIG. 1 is a cross-sectional side view of an embodiment of an engine according to the present invention.
Figure 2:
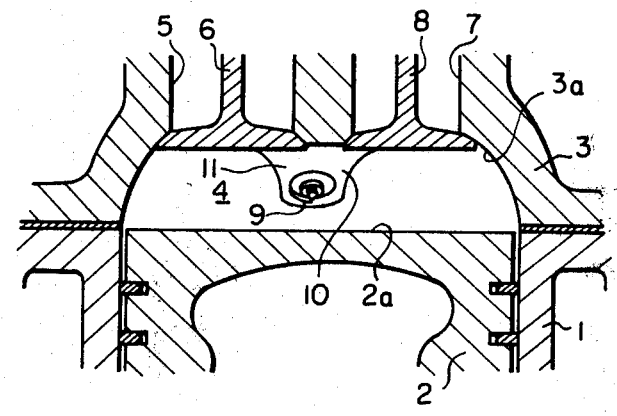
FIG. 2 is a cross-sectional side view taken along the line II—II shown in FIG. 1.
Figure 3:
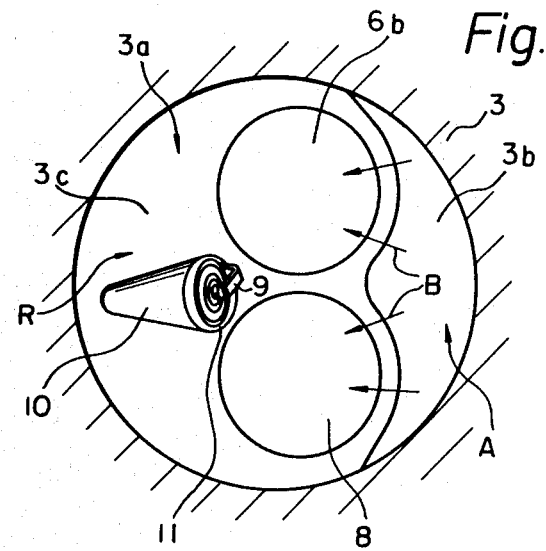
FIG. 3 is a bottom view of the cylinder head shown in FIG. 1.

Referring to FIGS. 1 through 3, 1 designates a cylinder block; 2 a piston reciprocally movable in the cylinder block 1; 3 designates a cylinder head fixed onto the cylinder block 1; 4 designates a combustion chamber formed between a flat top face 2a of the piston 2 and an inner wall 3a of the cylinder head 3; 5 designates an intake port; 6 an intake valve; 7 an exhaust port; 8 an exhaust valve; and 9 a spark plug. As is illustrated in FIG. 1, the peripheral portion of the inner wall 3a is formed into a flat surface 3b so that a squish area A having an approximately crescent shape as shown in FIG. 3 is formed between the flat surface 3b and the flat top face 2a of the piston 2 when the piston 2 is positioned at the top dead center as shown in FIG. 1. The remaining portion 3c of the inner wall 3a except for the flat suface portion 3b is formed into a smoothly curved surface having an approximately semi-spherical shape. A raised portion 10 projects downwards from the central portion of the semi-spherical remaining portion 3c. This raised portion 10 has an inclined side wall 11 facing the squish area A, and the spark plug 9 is arranged on the inclined side wall 11 so that the spark plug 9 is located at the approximate center of the combustion chamber 4.

During operation, at the time of the intake stroke, a fresh combustible mixture containing recirculated exhaust gas therein is introduced into the combustion chamber 4 from the intake port 5 via the intake valve 6. Then, the combustible mixture in the combustion chamber 4 is compressed as the piston 2 moves upwards at the time of the compression stroke. When the piston 2 approaches the top dead center, the combustible mixture in the combustion chamber 4 is ignited by the spark plug 9, and then a squish flow is spouted out from the squish area A as shown by the arrow B in FIG. 1. As is illustrated in FIGS. 1 and 3, since the spark plug 9 is arranged at the approximate center of the semi-spherical combustion chamber 4, the flame of the mixture ignited by the spark plug 9 is uniformly propagated in all direction from the spark plug 9. After this, when the squish flow B is spouted out from the squish area A, although a large part of the flame propagating towards the right side shown in FIG. 1 reaches the remaining portion 3c of the cylinder head 3, a part of the flame propagating towards the squish area A is pushed back by the squish flow B to a region R located behind the spark plug 9. Thus, the unburned mixture located within the region R is rapidly burned by the flame thus pushed back due to the occurence of turbulence caused by the squish flow B. As a result, the flame grows sufficiently and becomes strong before the downward movement of the piston 2 is started. After this, when the downward movement of the piston 2 is started, since the pressure in the squish area A is temporarily reduced as compared with that in the combustion chamber 4, the strong flame in the combustion chamber 4 is sucked into the squish area A. As a result of this, the unburned mixture within the squish area A is rapidly burned.

As was mentioned above, since the flame of the mixture ignited by the spark plug 9 can be caused to rapidly propagate over the entire space of the combustion chamber 4 by positioning the spark plug 9 at the center of the combustion chamber 4 and by forming the squish area A on one side of the peripheral inner wall of the cylinder head 3, it is possible to considerably increase the burning velocity.

Figure 4:
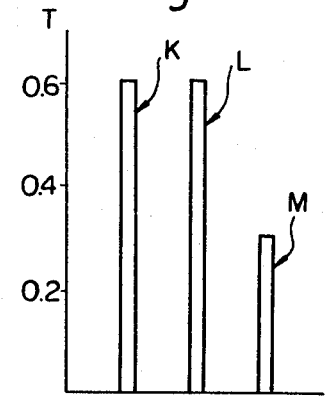
FIG. 4 is a graph showing torque fluctuations.

FIG. 4 shows the experimental result from measuring torque fluctuations. In FIG. 4, the ordinate T indicates torque fluctuations (Kg-m). In addition, in FIG. 4, K indicates torque fluctuation in a conventional engine in which the squish area is formed on one side of the peripheral inner wall of the cylinder head and in which the spark plug is arranged on the peripheral inner wall of the cylinder head at a position opposite to the squish area; L indicates torque fluctuation in a conventional engine in which a pair of squish areas is formed on the opposing peripheral portions of the inner wall of the cylinder head and in which the spark plug is arranged at the central portion of the combustion chamber; and M indicates torque fluctuation in an engine shown in FIG. 1. This experimental result was obtained under an operating condition wherein the number of revolutions per minutes of the engine was set at 2000 r.p.m, the air-fuel ratio of the mixture was set at 14.5:1, and the exhaust gas recirculation ratio was set at 20 percent while maintaining the level of the load of the engine and the amount of harmful NOx components in the exhaust gas at a constant level. From FIG. 4, it will be understood that, as is shown by M in FIG. 4, in an engine according to the present invention, the torque fluctuation is considerably reduced as compared with the torque fluctuations, shown by K and L, in a conventional engine, that is, the burning velocity in an engine according to the present invention is considerably increased as compared with that in a conventional engine.

Figure 5:
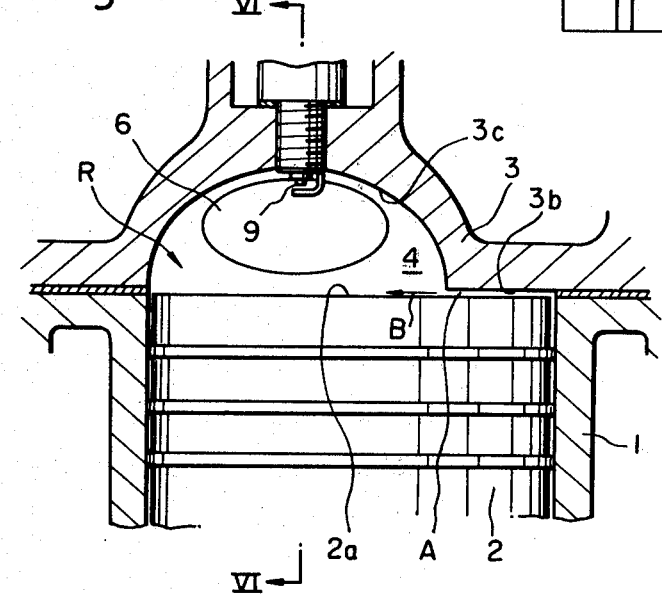
FIG. 5 is a cross-sectional side view of another embodiment according to the present invention.
Figure 6:
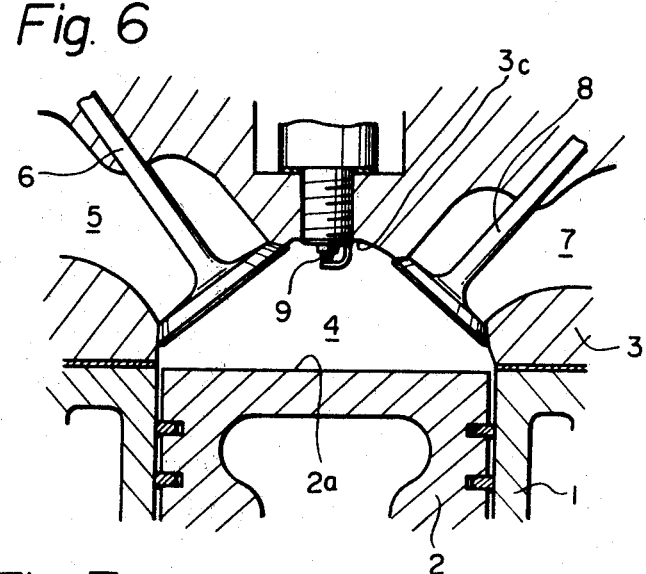
FIG. 6 is a cross-sectional side view taken along the line VI—VI shown in FIG. 5; and, FIG. 7 is a bottom view of the cylinder head shown in FIG. 5.
Figure 7:
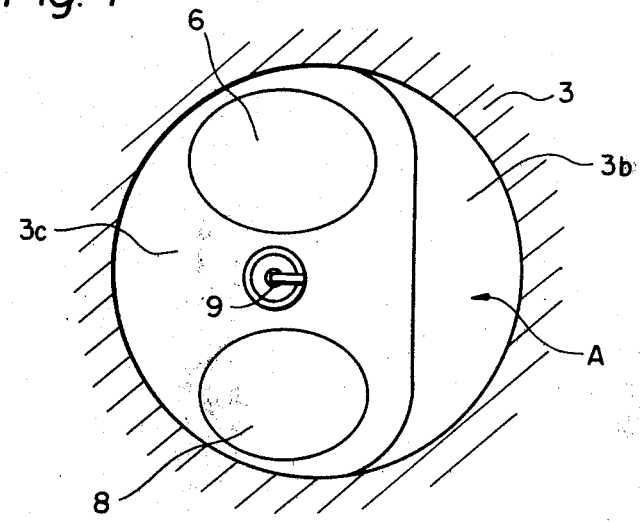

FIGS. 5 through 7 show another embodiment of the present invention. Referring to FIG. 5, the peripheral portion of the inner wall 3a is formed into a flat surface 3b so that a squish area A having an approximately crescent shape as shown in FIG. 7 is formed between the flat surface 3b and the flat top face 2a of the piston 2 when the piston 2 is positioned at the top dead center as shown in FIG. 5. In addition, the spark plug 9 is arranged at the apex of the semi-spherical inner wall 3a of the cylinder head 3. In this embodiment, as already described with reference to FIG. 1, a part of the flame propagating toward the squish area A is pushed back towards the region R located at a position opposite to the squish area A by the squish flow B. As a result, the unburned mixture within the region R is rapidly burned. In addition, when the downward movement of the piston 2 is started, the flame in the combustion chamber 4 is sucked into the squish area A, and thus the unburned mixture in the squish area A is burned.

According to the present invention, the burning velocity can be considerably increased by the formation of a single squish area on one side of the peripheral inner wall of the cylinder head and by the arrangement of the spark plug on an approximately central axis of the combustion chamber. As a result of this, the torque fluctuation is considerably reduced, and a stable combustion can thus be ensured.

While the present invention has been described with reference to specific embodiments chosen for purposes of illustration, it should be apparent that numerous modifications can be made thereto by those skilled in the art without departing from the spirit and scope of the invention.

what is claimed is:
1. An internal combustion engine comprising
a cylinder block having a cylinder bore therein;
a piston having a flat top face and being reciprocally movable in said cylinder bore;
a cylinder head fixed onto said cylinder block and having an inner wall overlying the adjacent end of the cylinder bore, said inner wall having a flat wall portion and a concave wall portion, said flat wall portion circumferentially extending along a part of the periphery of said inner wall and defining a flat squish area on one side of the axis of said cylinder bore between said flat wall portion and said flat top face of said piston, said concave wall portion and said flat top face of the piston defining a combustion chamber when said piston is at its top dead center position, which combustion chamber has a central axis parallel to and offset on an opposite side of the axis of said cylinder bore;
an intake valve arranged on said concave wall portion;
an exhaust valve arranged on said concave wall portion; and
a spark plug having a spark gap arranged in said combustion chamber, wherein the improvement comprises:
a projection having a concave bottom wall and a flat side wall extending from a region of the surface of the concave wall portion of said inner wall of the cylinder head located between the axis of the cylinder bore and said central axis of the combustion chamber, the flat side wall being inclined at an acute angle with respect to said central axis of the combustion chamber and facing the squish area, and a threaded bore extending through said projection perpendicular to said flat side wall, the spark plug being mounted in said threaded bore with its spark gap located close to the plane of said flat side wall approximately at a point on said central axis of the combustion chamber which is midway between the intersections of said central axis with the concave wall portion of the inner wall of the cylinder head and the flat top face of the piston when the piston is at its top dead center position, wherein the cross-sectional area of the projection progressively decreases with distance from said inclined flat side wall on the opposite side of the combustion chamber from the squish area, such that the concave bottom wall of the projection becomes flush with the concave wall portion of said cylinder head surrounding the projection prior to reaching the plane of said flat wall portion of said cylinder head, wherein the volume of the combustion chamber on said opposite side of the inclined side wall is approximately the same as the volume on the side facing the squish area.

2. An internal combustion engine as claimed in claim 1, wherein said flat wall portion of the inner wall of the cylinder head defining said squish area has an approximately crescent shape.

3. An internal combustion engine as claimed in Claim 1, wherein said concave wall portion has a smooth surface.

4. An internal combustion engine as claimed in Claim 3, wherein said concave wall portion has a semispherical shape.

* * * * *